United States Patent

[11] 3,624,011

[72] Inventor Fritz Schipke
 Meitingen uber Augsburg, Germany
[21] Appl. No. 62,135
[22] Filed Aug. 7, 1970
[45] Patented Nov. 30, 1971
[73] Assignee Siemens-planiawerke Aktiengesellschaft fur Kohle-Fabrikate
 Meitingen uber Augsburg, Germany
[32] Priority June 30, 1965
[33] Germany
[31] S 97,909
 Continuation of application Ser. No. 561,497, June 29, 1966, now abandoned. This application Aug. 7, 1970, Ser. No. 62,135

[54] CEMENT FOR NIPPLE JUNCTIONS OF CARBON ELECTRODES
 5 Claims, 1 Drawing Fig.
[52] U.S. Cl. .................................................. 260/9 R,
 260/17.4 ST, 260/28.5
[51] Int. Cl. .................................................. C08f 45/52,
 C08q 51/14
[50] Field of Search ....................................... 260/91,
 28.5, 17.4 ST, 41

[56] References Cited
UNITED STATES PATENTS

| | | | |
|---|---|---|---|
| 2,884,391 | 4/1959 | Winter et al. ................ | 260/28.5 |
| 2,956,040 | 10/1960 | Dietz et al. ................... | 260/73 |

OTHER REFERENCES

Chem. Abstracts, Vol. 55: 20393i, "Binder Fuel Briquets," N. V. Briko

Chem. Abstracts, Vol. 55: 22776i, " Ability– Prepare– Production." (Vieira)

*Primary Examiner*—William H. Short
*Assistant Examiner*—Edward Woodberry
*Attorney*—Curt M. Avery

---

ABSTRACT: Described is a carbonaceous cement for nipple junctions between carbon electrodes. The cement comprises, by weight, a mixture of 20 to 30 percent of a furfuraldehyde thermosetting condensation resin having a viscosity of 50 to 500 cp. 25 to 60 percent pitch having a melting point of 120 to 180° C. (according to Kramer-Sarnow), 10 to 40 percent carbon filler material, and 5 to 25 percent dextrin. The mixture is of a plastic consistency so as to be pressable into the shape of pins and is useful at relatively low operating temperatures.

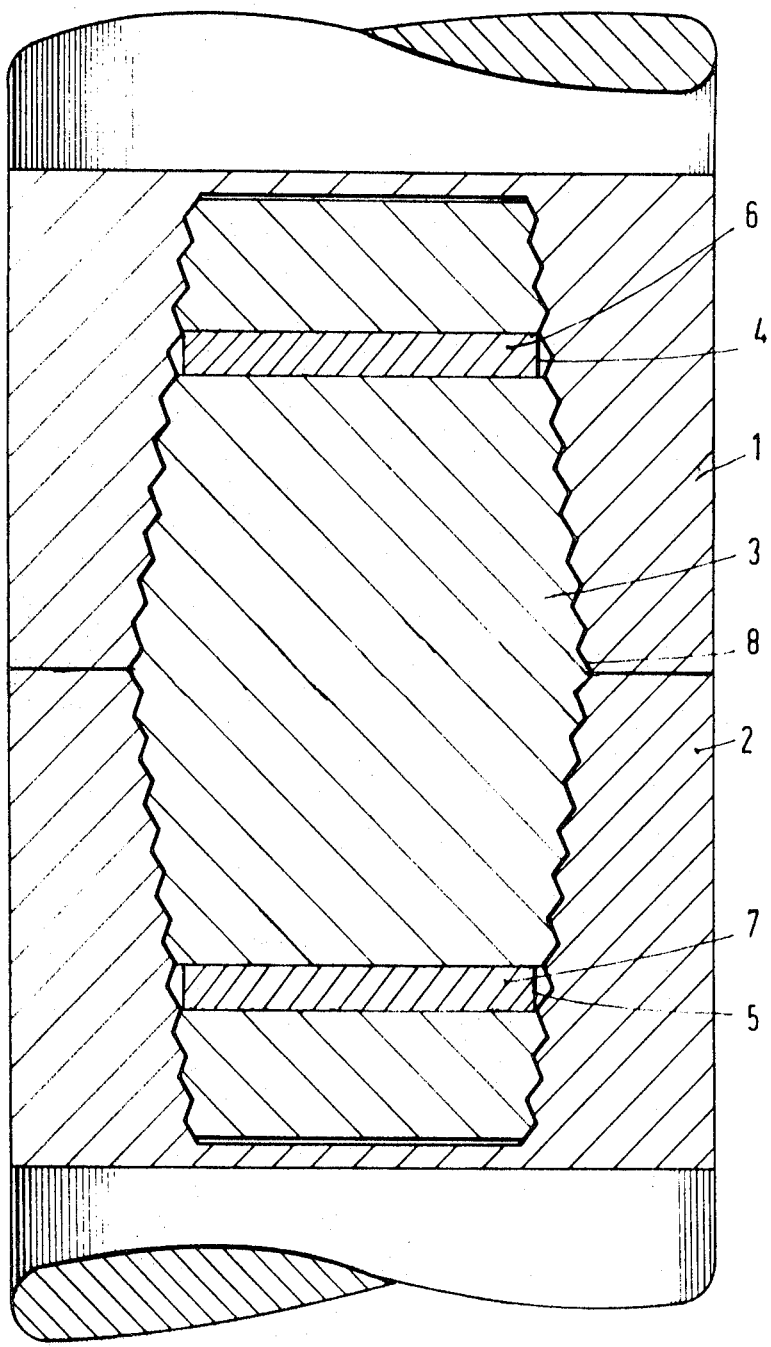

CEMENT FOR NIPPLE JUNCTIONS OF CARBON ELECTRODES

This is a continuation of application Ser. No. 561,497, filed June 29, 1966 now abandoned.

My invention relates to a cement for nipple junctions of carbon electrodes.

It is known to operate electric steel smelting furnaces with the aid of graphite or other carbon electrodes which are gradually consumed during smelting. For continuous performance the carbon electrodes are replenished from time to time by attaching new electrode parts. As a rule, the electrode parts are joined by a screw nipple which engages respective threaded sockets in the electrode parts. Conventionally, the nipple junction is made secure by cementing. As a rule, the cement used for this purpose carbonizes when heated. There are several ways of placing the cement onto the junction components. One way is to brush the cement onto the nipple and the adjacent electrode parts while the junction is being made. Another way is to enter cement in the form of pitch, shaped as a pin, into cavities of the nipple, When the carbon electrode is heated during operation, the pitch will drain from cavities and penetrate between the screw threads on the nipple and in the sockets of the electrode parts, thus cementing them together. In many cases however the strength of a nipple junction secured with the aid of a pitch pin is insufficient. This particularly applies to temperatures below 400° C. at which cementing with pitch causes no appreciable strengthening of the nipple junction.

It is further known to employ carbonaceous cement consisting of synthetic resin with an addition of carbon filler material. Such a cement, however, is not suitable for use in the shape of a pin. If the share of filler substance is too large, the pin would remain rigid and would not drain from the nipple cavities into and between the screw threads. If a smaller share of filler material is used, the cement becomes too soft or liquid and hence cannot be pressed to the shape of suitable pins.

It is an object of my invention to provide a cement for reliably locking a nipple and socket junction between carbon electrodes, that avoids the shortcomings of the cement materials heretofore available. More particularly, it is an object of the invention to devise a cement composition for the just-mentioned purpose which assures preserving the desired reliability of the nipple junction even at relatively low operating temperatures, such as 400° C. or less, and which can be readily pressed to the shape of pins suitable to withstand the manipulation required for inserting them into cavities of the nipples, while nevertheless draining from these cavities into the interstices between the threads on the nipple and the electrode sockets when the junction is subjected to elevated temperatures.

According to the invention, the nipple-junction cement consists of a mixture of hardenable synthetic resins with pitch, carbon filler material and dextrin, the consistency of the mixture being such as to permit pressing it into the shape of pins.

Particularly well suitable are cement mixtures formed of 25 to 60 percent pitch, 5 to 25 percent dextrin, 20 to 30 percent synthetic resin and 10 to 40 percent carbon filler material. (All percentages are by weight). Very good results have been obtained with a cement mixture of 30 to 40 percent pitch, 20 to 30 percent synthetic resin, 10 to 20 percent dextrin and 20 to 30 percent carbon filler material.

Preferably the pitch used has a melting point (according to Kramer-sarnow) of 120 to 180° C., particularly 140° to 160° C.

Preferably employed as the synthetic resin component is a thermosetting plastic, preferably a condensation product having a viscosity of 50 to 500 c.p., preferably a viscosity of 50 to 150 c.p.

The carbon filler material of the cement preferably consist of coke dust, particularly in a maximal grain size below 60 micron.

The cement mixture according to the invention can be readily fabricated, for example with the aid of an extrusion press, to the shape of a strand that can be cut into pins. These cement pins can be accommodated in corresponding bores or other recesses of the electrode nipples. However the cement may also be pressed as a shapeless mass into the nipple bores. The consistency of the cement in such that it remains solid and retains its shape during storage and will not drain from the nipple bores at normal room temperature. Only when the cement is subjected to heating, will it become liquid and then drain out of the nipple bores and fill the interstices between the screw threads of the nipple and the electrode sockets. Due to the use of a thermosetting synthetic resin as the resinous component, while avoiding the addition of a hardner, the cement according to the invention has a virtually unlimited shelf life. The cement further achieves a considerably better adhesive strength within the nipple junction comparison with the pitch pins heretofore known for such purposes.

An example of a nipple junction equipped with cement pins according to the invention is illustrated by way of example on the accompanying drawing.

The illustration shows in diametrical section the connection between an upper electrode portion 1 and a lower electrode portion 2. The two portions are joined by a double-conical screw nipple 3 in threaded engagement with the interior screw thread of respective sockets in the butt ends of the electrode portions. The upper and lower portion of the nipple 3 are provided with respective horizontal bores 4 and 5 extending diametrically through the nipple body. Inserted into the bores 4 and 5 are respective pins 6 and 7 consisting of the cement mixture according to the invention. When the junction area of the electrode assembly has been heated due to the operation of the assembly, the cement liquifies and flows out of the bores into spaces remaining between the screw threads 8 between nipple 3 and the electrode sockets. During further heating, the cement in these interspaces is disassociated and carbonized, thus forming a solid and rigid bond which reliably locks the nipple junction.

Examples of cement mixtures according to the invention will now be described in detail.

EXAMPLE 1

A cement mixture was prepared from 30.5 percent by weight of pitch having a solidification point between 160 and 170° C. and a coke content of 60 percent. The pitch was mixed with 20 percent of a thermosetting condensation resin, 30.5 percent coke dust having a maximum grain diameter of 60 micron, and 13 percent dextrin. This cement mixture was shaped into pins which were inserted into two radial bores fully traversing a nipple and having each a diameter of 9 mm. The nipples thus prepared were employed for joining electrode portions of the dimension 180×150 mm. The nipple junction was then heated to different testing temperatures, and the strength of the nipple junction was measured at different temperatures by attempts to separate the junction by twisting. The following values were thus measured. At 200° C.: 20 mkg, at 300° C.: 36 to 46 mkg, at 400° C.: more than 50 mkg, and at 500° C.: more than 50 mkg.

EXAMPLE 2

A cement mixture was prepared from 33.3 percent pitch having a solidifying point of 160 to 170° C., 28.6 percent of a thermosetting condensation resin, 23.8 percent coke dust having a maximal grain size below 60 micron, and 14.3 percent dextrin. The strength of the nipple junction was measured as described in example 1, and the results were substantially identical with those given in example 1.

EXAMPLE 3

A cement mixture was prepared of 35 percent pitch having a solidification point between 160 ° and 170° C., 30 percent of a thermosetting condensation resin, 20 percent coke dust having a maximal grain size below 60 micron, and 15 percent dextrin. The mixture was more brittle than those according to examples 1 and 2 but exhibited substantially the same properties in the other respects mentioned above.

EXAMPLE 4

A cement mixture was prepared of 58 percent pitch having a solidification point between 160° and 170° C., 21 percent of a thermosetting condensation resin, 16 percent coke dust, and 5 percent dextrin. The following values of strength were measured in twisting tests made as described in example 1: at 200° C.: 16 to 17 mkg, at 300° C: 16 to 17 mkg, at 400° C.: 23 to 25 mkg, at 500° C. more than 50 mkg.

The tests made in accordance with the examples described in the foregoing showed that the cement according to the invention effectively locks the nipple junction at relatively low temperatures, for example 300° C., and that this locking effect remains preserved after complete carbonization of the cement at about 500° C.

A preferred synthetic resin, and that which was used in the specific examples, is a furfural-aldehyde polycondensation product prepared in accordance with U.S. Pat. No. 2,956,040. Any of the resins of said patent are suitable for this invention.

I claim:

1. A carbonaceous cement for nipple junctions between carbon electrodes, consisting essentially of, by weight, a mixture of 20 to 30 percent thermosetting condensation resin, said resin being a furfural-aldehyde polycondensation product having a viscosity of 50 to 500 c.p., 25 to 60 percent pitch having a melting point of 120° to 180° C. (according to Kramer-Sarnow), 10 to 40 percent carbon filler material and 5 to 25 percent dextrin, said mixture of plastic consistency so as to be pressable to the shape of pins.

2. An electrode nipple cement according to claim 1, consisting essentially of 20 to 30 percent by weight of said resin, 30 to 40 percent pitch, 20 to 30 percent carbon filler material, and 10 to 20 percent dextrin.

3. A cement according to claim 1, wherein said pitch has a melting point (according to Kramer-Sarnow) of 140° to 160° C.

4. A cement according to claim 1, wherein said resin has a viscosity of 50 to 150 c.p.

5. A cement according to claim 1, wherein said carbon filler material is coke dust.

* * * * *